United States Patent [11] 3,619,637

| [72] | Inventor | Kenya Goto<br>Yokohama-shi, Japan |
|------|----------|-----------------------------------|
| [21] | Appl. No. | 877,961 |
| [22] | Filed | Nov. 19, 1969 |
| [45] | Patented | Nov. 9, 1971 |
| [73] | Assignee | Tokyo Shibaura Electric Co., Ltd.<br>Kawasaki-shi, Japan |
| [32] | Priority | Nov. 20, 1968 |
| [33] | | Japan |
| [31] | | 43/84520 |

[54] HARMONIC GENERATOR HAVING CASCADED CRYSTALS
11 Claims, 10 Drawing Figs.
[52] U.S. Cl. .................................................. 307/88.3, 321/69 R
[51] Int. Cl. ...................................................... H02m 5/16
[50] Field of Search ............................................. 321/69; 307/88.3

[56] References Cited
UNITED STATES PATENTS
| 3,384,433 | 5/1968 | Bloembergen ............... | 321/69 |
| 3,387,204 | 6/1968 | Ashkin et al. ................. | 321/69 |
| 3,407,309 | 10/1968 | Miller ........................... | 321/69 |

Primary Examiner—John Kominski
Assistant Examiner—Darwin R. Hostetter
Attorney—Flynn & Frishauf ABSTRACT: A harmonic generator comprises at least two nonlinear dielectric crystals of which the planes of incidence and exit are parallel to each other and controlled to match the phase of the electromagnetic waves inciding the plane of incidence prependicularly thereto with the phases of the harmonic wave. These crystals are disposed in cascade such that the projections of the optical axes of the crystals upon their incidence planes intersect each other at right angles whereby to generate approximately double the output harmonic waves at high efficiency irrespectively of the orientation of the plane of polarization of the incident light ray.

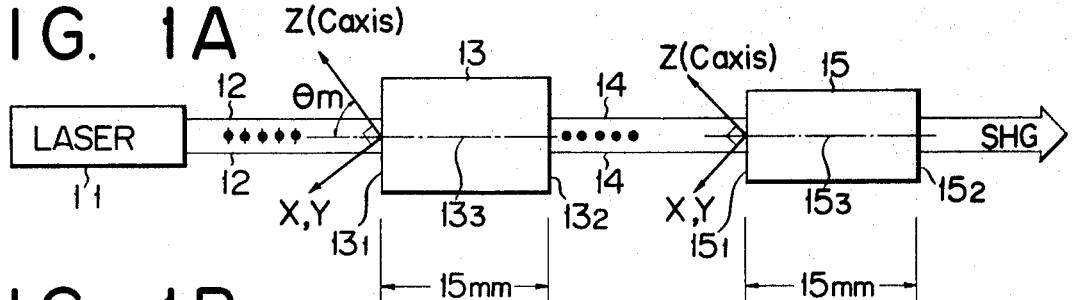
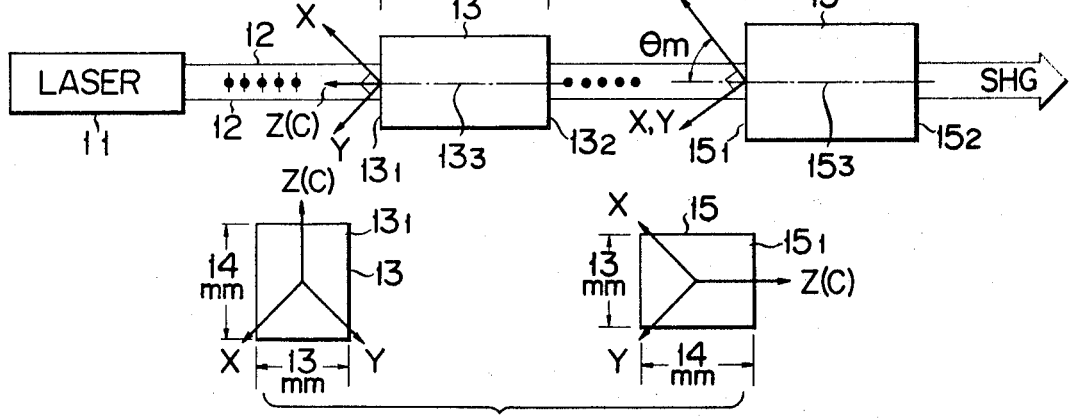
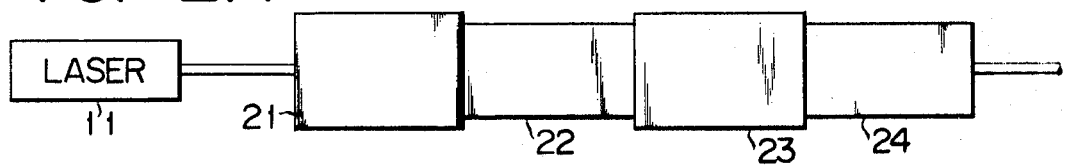
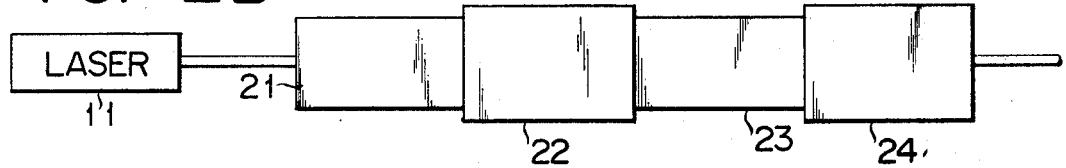
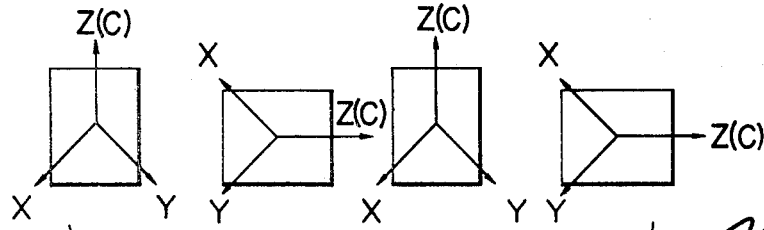

HARMONIC GENERATOR HAVING CASCADED CRYSTALS

BACKGROUND OF THE INVENTION

This invention relates to double electromagnetic waves having a wavelength of less than one centimeter, and more particularly to a harmonic generator for doubling laser light output by means of a nonlinear dielectric crystal.

It is already known that when a nonlinear dielectric crystal, which is a double refractive and an acentrosymmetric dielectric crystal is irradiated with coherent light such as laser light, harmonic waves of the laser light are generated in the crystal. Among practical means for generating such harmonic waves at high efficiencies are the following means. In one arrangement potassium dihydrogen phosphate $KH_2PO_4$(KDP) is utilized as the nonlinear dielectric crystals and the red light from a ruby laser is projected upon the dielectric at an angle of about 50° with respect to the optical axis of the crystal. Such an incidence angle of the laser light is the angle at which the incident laser light and the second harmonic light induced in the crystal match in phase with each other. Generally, in a crystal, the refractive indices in the fundamental wave and the second harmonic wave are different from each other because there occurs dispersion depending upon wavelength. However, where a double refractive crystal is used it is possible to match the phase of ordinary ray corresponding to the fundamental wave with that of an extraordinary ray corresponding to the second harmonic wave. To obtain efficient phase matching it is necessary to adjust the incidence light beam at an angle of 50° with respect to the optical axis of the crystal. With this known arrangement, it is possible to cause the incidence light to incide perpendicularly upon the incidence surface by suitable cutting of the crystal. However, in such a harmonic generator the intensity of the second harmonic is influenced by the orientation of the plane of polarization of the incident ray. More particularly, where the incident light is a polarized light, the intensity of the second harmonic is a maximum when the plane of polarization is parallel with the optical axis of the crystal whereas the intensity is zero when the plane of polarization is normal to the optical axis. Where the incident light is not a polarized light, the generation of the second harmonic is attributed to only the component of the polarized wave which is parallel with the optical axis whereas the component perpendicular to the optical axis does not contribute to the generation of the second harmonic wave and passes through the crystal freely.

Thus, in this arrangement, in order to derive the harmonic wave out of polarized incident light at high efficiencies it is necessary to dispose the plane of polarization in parallel with the optical axis. Where the incident light is not a polarized light the component of the polarized light which is perpendicular to the optical axis is not used effectively, thus lowering the efficiency.

SUMMARY OF THE INVENTION

It is an object of this invention, where a nonpolarized incident light is utilized, to use efficiently the component of the polarized light normal to the optical axis to produce harmonic waves.

Another object of this invention is to generate the harmonic waves at the maximum efficiency without regard to the orientation of the plane of polarization where a polarized light is used.

According to this invention, at least two nonlinear dielectric crystals are used which are provided with parallel incidence planes and exit planes and are so controlled that the phases of the fundamental and the harmonic waves inciding perpendicularly upon the incidence plane are matched with each other. There are many means that can be utilized to match the phase of the harmonics with that of the incident light inciding perpendicularly upon the incident plane. Among these are, for example, a method of controlling the incidence angle of the light ray upon the crystal, a method of changing the refractive index by the temperature control of the crystal and a method of controlling the refractive index by the control of the voltage impressed upon the crystal. Two crystals adapted to receive such controlled lights are so arranged that the axes assumed to pierce perpendicularly the incidence planes and exit planes will be parallel to each other and that the projection of the optical axes of respective crystals upon the incidence planes intersect each other at right angles with respect to the incident ray. Accordingly, the light inciding perpendicularly upon the incidence plane of the first crystal advances straight therethrough and makes its exit perpendicularly from the plane of exit. Also this light is caused to impinge perpendicularly upon the incidence plane of the second crystal and exit perpendicularly from the plane of exit thereof. While transmitting through the first crystal the components of the incidence light which are parallel the optical axis of the first crystal function to contribute to the generation of the harmonics whereas the components that intersect at a right angle with respect to the optical axis advance straight therethrough and enter into the second crystal. Since the second crystal is disposed with its optical axis perpendicular to that of the first crystal, the components of the polarized light that have passed freely through the first crystal contribute to the generation of harmonics in the second crystal. The components of the polarized light that have contributed to the generation of the harmonics in the first crystal do not induce the harmonics in the second crystal but merely penetrate therethrough. As a consequence, harmonics having an intensity twice as large as that of the arrangement employing only one crystal can be emitted from the plane of exit of the second crystal, provided that the attenuation in the crystal is neglected.

BRIEF DESCRIPTION OF THE DRAWINGS

FIGS. 1A, 1B and 1C show the construction of a harmonic generator of this invention utilizing an angle control system;

FIGS. 2A, 2B and 2C show a modified harmonic generator employing an angle control system;

DESCRIPTION OF THE PREFERRED EMBODIMENTS

Figure 3:
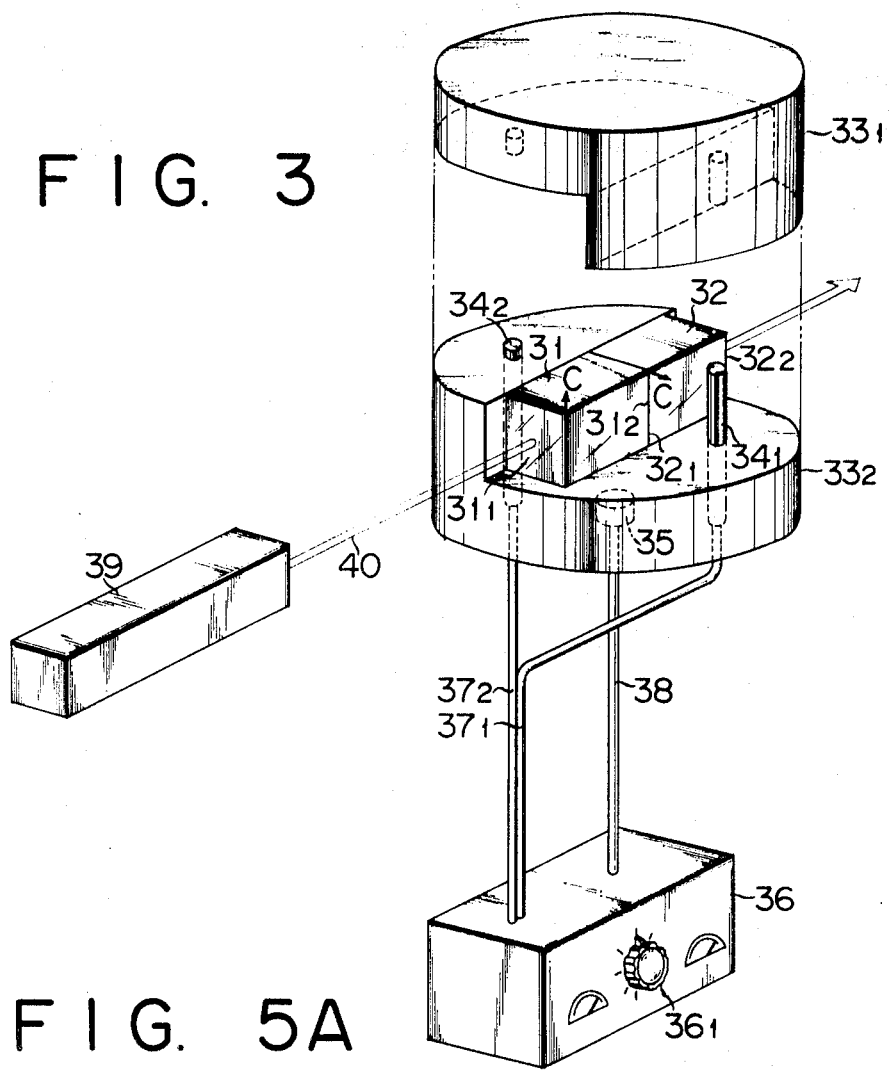
FIG. 3 shows a perspective view of a further embodiment of the harmonic generator of this invention employing a temperature control system.

Referring now to the accompanying drawings, FIGS. 1A, 1B and 1C show a side elevation, a plane view and a front view, respectively, of a harmonic generator of this invention employing an angle control system. In this embodiment, a laser is utilized as a source of light wave 11. Although a ruby laser, a gas laser or a laser of any type may be used, a YAG laser employing $Y_3Al_5O_{12}:Nd^{3+}$ is preferred. The light wave generated from this laser 11 are infrared rays having a wavelength of 1.06 microns. The light wave is applied to a first crystal 13 through a passage defined by lines 12. Although not limited to any material, the first crystal is a so-called nonlinear dielectric crystal of potassium dihydrogen phosphate $KH_2PO_4$(KDP), ammonium dihydrogen phosphate $NH_4H_2PO_4$(ADP), $LiNbO_3$, $Ba_2NaNb_5O_{15}$, etc. Crystal 13 is a rectangular solid having an incidence plane $13_1$ and an exit plane $13_2$ which are parallel with each other. The side of the crystal as viewed from the light wave source 11 is rectangular as shown in FIG. 1C. It is to be understood that the crystal 13 is cut so that the phase of the incident light impinging perpendicularly upon its incidence plane $13_1$ matches with that of the harmonics. In this embodiment, the crystal is cut to provide the phase matching between the input fundamental wave and the second harmonic wave thereof. Thus, the optical axis Z(C axis) of the crystal intersects an axis $13_3$ which is perpendicular to both incidence and exit planes $13_1$ and $13_2$ at an angle of $\theta m$, which is the so-called angle of phase matching and is given by the following equation $$\sin^2 \theta m = \left(\frac{n_2{}^e}{n_1{}^o}\right)^2 \frac{(n_2{}^o)^2 - (n_1{}^o)^2}{(n_2{}^o)^2 - (n_2{}^e)^2}$$

where $n_1{}^o$ is the refractive index for the ordinary ray of the fundamental wave, $n_1{}^e$ is the refractive index for the extraordinary ray of the fundamental wave, $n_2{}^o$ is the refractive index for the ordinary ray of the second harmonic wave, and $n_2{}^e$ is the refractive index for the extraordinary ray of the second harmonic wave.

For the angle of phase matching of $\theta m$ $n_1{}^o(\theta m) = n_2{}^e(\theta m)$ or $n_2{}^e(\theta m) = n_1{}^e(\theta m)$ Thus, the refractive indices of the fundamental wave and of the second harmonic wave are equal so that their phases also match with each other. Symbols X, Y and Z represent rectangular coordinates wherein the Z axis is in the direction of the optical axis. As shown in FIG. 1C, the crystal 13 is cut in such a manner that the longer sides of the front surface or the incidence plane of the crystal 13 are parallel with the projection of the optical axis Z(C) on the front surface, whereas the shorter sides are included in the x-Y plane and intersect at an angle of 45° with axes X and Y. Such a cutting is the so-called 45° Z cut. The invention is not limited to this particular cutting angle but it only means that the conventional harmonic generator applied with single crystal is utilized in this embodiment. While passing through the crystal 13 controlled angularly in this manner, the light wave inciding perpendicularly upon the incidence plane $13_1$ of crystal 13 generates second harmonic due to the nonlinear characteristic of the crystal, said second harmonic being emitted from the exit plane $13_a$. Assume now that the light wave emanated from the source of light 11 is not polarized at all. Consider now a component in the direction of the vibration of the polarized wave parallel to the sheet of the drawing shown by segments crossing the dots in the drawing and that of the polarized wave perpendicular to the sheet of the drawing (shown by dots). Of these components, those which contribute to the generation of the second harmonic while passing through the first crystal 13 are the components parallel to the sheet of the drawing whereas the components perpendicular to the sheet of the drawing pass freely and exit from the plane of exit $13_2$. Such light as transmitted through the first crystal incides perpendicularly upon an incidence plane $15_1$ of a second crystal 15 through a path shown by parallel lines 14. The second crystal 15 is constructed identical to as the first crystal 13. Thus the second crystal 15 is a rectangular solid having an incidence plane $15_1$ and an exit plane $15_2$ parallel thereto and is cut such that as an axis $15_3$ normally extending through these parallel planes $15_1$ and $15_2$ makes a phase matching angle $\theta m$ with the optical axis Z(C) of the crystal. The second crystal 15 is so disposed with respect to the first crystal 13 that normal lines through their incidence planes are parallel with each other. In other words, these crystals are disposed such that the light wave emitted normally from the plane of exit $13_2$ of the first crystal 13 incides perpendicularly upon the plane of incidence $15_1$ of the second crystal 15. Further, the second crystal 15 is rotated 90° about the axis $15_3$. More particularly, as shown by the front view of FIG. 1C the first and second crystals are arranged such that projections of the respective axes upon incidence planes $13_1$ and $15_1$ intersect each other at right angles. For this reason, the component of the polarized wave emerged from the plane of exit $13_2$ of the first crystal 13 and which has merely passed therethrough will incide upon the second crystal 15 with the direction of polarization parallel to the optical axis. Accordingly, this component of the polarized wave contributes to the generation of the second harmonic while it passes through the second crystal 15. Since the plane of polarization of the second harmonic generated in the first crystal 13 by the light wave passing therethrough is parallel with the sheet of the drawing it will not generate any harmonic while it passes through the second crystal. As a result, a second harmonic induced in the respective crystals will have polarized light waves displaced from each other at an angle of 90° and will be emerged from the plane of exit $15_2$ of the second crystal 15. Thus, when the generated second harmonic waves which are linearly polarized waves from each other are ejected from the second crystal and joined together in a single beam, these waves become a nonpolarized second harmonic wave, and the efficiency of the generation of the second harmonic waves in the above crystals is constant irrespective of any direction of the polarized plane of the incidence light waves.

Where a laser having a wavelength of 1.06 μm. and an output of 1 mw. was utilized as the source of light and two cascated KDP crystals were used, an output of 60 kw. of a wavelength of 0.53 μm. was obtained. Thus the efficiency was 6 percent. On the contrary, the efficiency of a prior art harmonic generator utilizing a single crystal was only 3 percent and the output was 30 percent kw. for the same input.

With the novel harmonic generator utilizing a crystal of $LiNbO_3$ a second harmonic output of 400 kw. was obtained at an input of 1 mw. With the prior art device, the output was only one-half, or 200 kw.

While above description relates to a case wherein the light wave emanated from the source of light is not polarized, polarized light waves function in substantially the same manner. More particularly, by analyzing the polarized light wave into a first component parallel to the optical axis and a second component perpendicular to the optical axis, it will be clear that these components respectively function to induce second harmonics in two crystals just in the same manner as the nonpolarized input wave. As a result, in the novel device it is not necessary to operate the plane of polarization of the polarized light to be parallel with the optical axis. In the prior art device, however, in order to maximize the efficiency of harmonic generation it has been essential to adjust the plane of polarization which usually requires extremely complicated operations.

FIG. 2 diagrammatically shows a harmonic generator employing more than two crystals, in which FIGS. 2A, 2B and 2C show a side view, a top plan view and a front view, respectively. Source of light 11 is a laser device identical to that shown in FIG. 1. Four crystals 21, 22, 23 and 24 are arranged on a straight line with respect to the light emanated from the source 11. As each crystal has the same construction as those shown in FIG. 1, description thereof will not be repeated. Further, four crystals are arranged in cascade such that projections of the optical axes of mutually adjacent crystals intersect at right angles as shown in FIG. 2C.

With this arrangement, the component of the light wave that has passed through two crystals 21 and 22 but not yet contributed to the generation of the second harmonic, will cause the generation of a second harmonic while transmitting through the third and fourth crystals 23 and 24. Thus, the efficiency is improved further. However, as the number of crystals is increased, the efficiency is decreased due to the loss caused by the reflection at the plane of the incidence and the plane of exit of respective crystals and by the absorption therein. In this embodiment four to five crystals (each 13×14×

The above embodiments refer to the use of an angle control system. A modified embodiment employing a temperature control system will now be described hereunder. Certain nonlinear dielectric crystals vary greatly in their refractive indices dependent upon temperature, thus, as is known, varying the angle of phase matching $\theta m$ with temperature. Thus, for example, in a paper of Robert C. Miller, G. D. Boyd and A. Savage entitled "NONLINEAR OPTICAL INTERACTION IN $LiNbO_3$ WITHOUT DOUBLE REFRACTION" in Applied Physics Letters, Volume 6, Number 4, 15, Feb. 1965 there is shown a graph indicating a manner in which the value of $\sin^2\theta m$ varies with temperature. Accordingly, with such temperature dependent crystals it is easy to construct a harmonic generator of this invention without the necessity of cutting the crystals at a special angle.

FIG. 3 illustrates such an embodiment. More particularly, two nonlinear dielectric crystals 31 and 32 contributing to the generation of the second harmonics are provided with temperature control means comprising heat preserving blocks $33_1$ and $33_2$, heaters $34_1$ and $34_2$, a temperature detector 35 and a control box 36. Heat preserving blocks $33_1$ and $33_2$ are in the form of short cylinders having stepped portions at their opposing surfaces which are adapted to define an oven to accommodate crystals 31 and 32. A pair of heaters $34_1$ and $34_2$ are embedded in the heat preserving block $33_2$ which may be electric heating elements connected to a source of electric power (not shown) contained in the control box via conductors $37_1$ and $37_2$. A temperature detector 35 such as a thermistor is embedded in the heat preserving block $33_2$ and is connected to the control box via conductors 38.

Although not shown in the drawing, the control box 36 includes the source of supply, a manual voltage regulator an automatic voltage regulator or the like to manually adjust the current supplied to said heating elements $34_1$ and $34_2$ and to automatically regulate the current supplied to these heating elements in accordance with the output of the temperature detector 35.

Crystal 31 is formed as a rectangular solid having an incidence plane $31_1$ which is parallel with its exit plane $31_2$. In this embodiment the crystal is cut to have dimensions of 6×6×0 mm. As shown by an arrow the optical axis Z of the crystal is parallel with one side of the incidence plane $31_1$. The other crystal 32 is constructed identically. These two crystals 31 and 32 are disposed such that the axes extending normally through their incidence planes and exit planes are parallel with each other. In other words, these crystals are disposed so that the light wave 40 emanated from a source of light 39 goes perpendicularly through their incidence planes and exit planes, and that their axes Z intersect each other at right angles. It is to be understood that optical axes of these crystals need not be necessarily parallel with one side of the incidence plane as above described but instead they may be in any direction in the incidence plane or may be located outside thereof. In any case, it is essential that the projections of the optical axes on the incidence planes should intersect at right angles.

In the above described harmonic generator, by selecting a suitable temperature for crystals 31 and 32 by adjusting a knob $31_1$ of the voltage regulator contained in the control box 36 it is possible to match the phases of the fundamental and the second harmonic or of more high harmonics with the phase of the light wave 40 emanated from the light source 39 and inciding normally upon the incidence planes of crystals 31 and 32.

While in this embodiment, two crystals are housed in the same heat preserving block to be controlled by the same temperature controlling device, it will be clear that these crystals may be contained in separate heat preserving blocks with separate temperature controlling devices.

Figure 4:
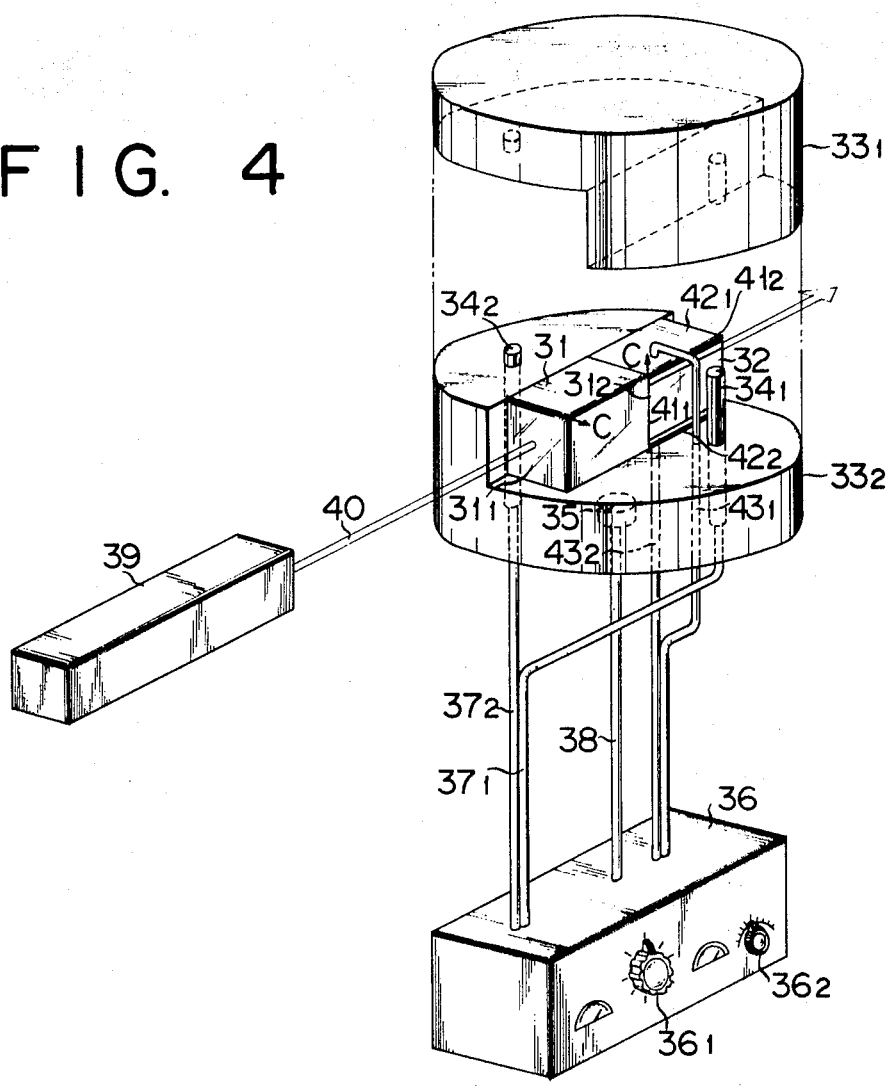
FIG. 4 shows a perspective view of a still further embodiment of a harmonic generator of this invention employing a temperature control system.

FIG. 4 shows a modification of the harmonic generator shown in FIG. 3 wherein a voltage controlling device is added. In the harmonic generator shown in FIG. 3 since two crystals are controlled by the same temperature controlling device, these crystals are required to have the same temperature characteristic. However, because it is difficult to produce and maintain both crystals with a perfect phase matching characteristic it is advantageous to provide an additional phase controlling device. The embodiment shown in FIG. 4 is similar to that shown in FIG. 3 and like elements are designated by the same reference numerals. In the embodiment shown in FIG. 4, plate electrodes $41_1$ and $41_2$ are secured to the upper and lower surfaces of one crystal 32. Plate electrodes opposed to the Z axis of this crystal perpendicularly are covered by sheets of insulator $42_1$ and $42_2$ to electrically insulate them from heat preserving blocks $33_1$ and $33_2$. Plate electrodes are connected to insulated conductors $43_1$ and $43_2$ respectively which are connected to a source of supply (not shown) contained in the control box 36. The source is a DC source provided with a second voltage regulator operated by a second knob $36_2$ mounted on the outside of the control box.

It has been already known that the refractive index of a dielectric crystal varies when a voltage is impressed across the crystal. For this reason, in this embodiment, when a suitable temperature is initially set by the first knob $36_1$ to provide an approximate setting of the phase matching, then it is possible to provide further adjustment of the phase relationship of only one crystal 32 by the adjustment of the second knob. This can eliminate any difference in phases caused by the difference between temperature characteristics of two crystals, thus easily assuring perfect phase matching thereof. Plate electrodes may be provided for either one of the two crystals or on the opposite sides thereof, and also plate electrodes may be provided for both crystals.

FIG. 5 shows a still further modification of the harmonic generator employing the voltage control system which also utilizes the variation in the refraction index of the crystal as a function of voltage.

Figure 5A:
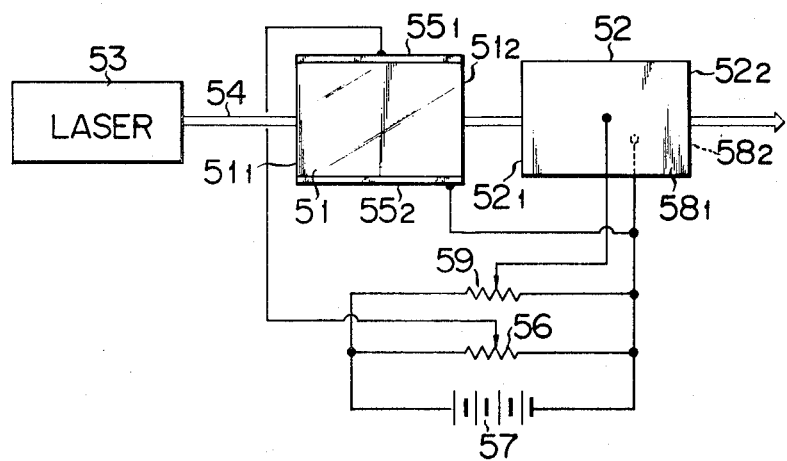
FIGS. 5A and 5B are diagrams to show a harmonic generator of this invention employing a voltage control system.
Figure 5B:
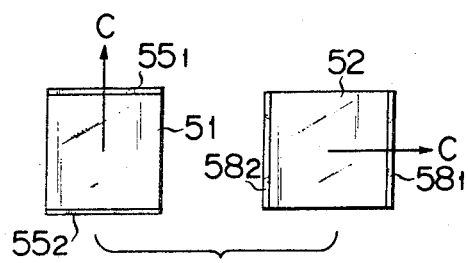

Similar to that shown in other embodiments, each one of two crystals 51 and 52 shown in the FIG. 5A is a pair of rectangular solids of dielectric crystals having incidence planes $51_1$ and $52_1$ and exit planes $51_2$ and $52_2$ which are parallel with each other. Again, the two crystals are disposed such that the axes extending normally through their incidence planes and exit planes will be parallel with each other, that is the light wave 54 from a source of light 53 transmits perpendicularly through the incidence planes $51_1$ and $52_1$ of both crystals. As shown in the front view shown in FIG. 5B these two crystals are disposed so that projections of the topical axis Z on the incidence planes of the crystals intersect each other at right angles. On the upper and lower surfaces of the crystal 51 are secured plate electrodes $55_1$ and $55_2$, respectively, which are connected to a first voltage regulator 56 by conductors. The voltage regulator 56 is connected to a DC source 57. Similarly, the other crystal 52 is also provided with a pair of plate electrodes $58_1$ and $58_2$ on the opposite sides thereof, because it is advantageous to apply the voltage in the direction of the optical axis of the crystal. Plate electrodes $58_1$ and $58_2$ are connected to the source 57 through a second voltage regulator 59.

Although in this embodiment each crystal is associated with an independent voltage regulator, the plate electrode may be provided in common for two crystals with equal results.

While the invention has been shown and described in terms of its preferred embodiments, it should be understood that the invention is not limited to these particular embodiments but may be carried out in different manners without departing from the spirit and scope of the invention. Thus for example, the angle control system, the temperature control system and the voltage control system which are used as the phase matching means between fundamental wave and harmonic wave may be combined into a single system. For example, one of the two crystals may be controlled by the angle control system to provide phase matching while the other may be controlled by the temperature control system or the voltage control system to provide phase matching. Alternatively, it is also possible to control one crystal by the temperature control system and the other by the voltage control system. Also in cases where the temperature control system and the voltage control system are used singly or in combination, three or more crystals may be used as shown in FIG. 2. Further, while this invention has been described in terms of electromagnetic waves of light frequency, the principle of this invention can equally be applied to electromagnetic waves of longer wavelength, such as waves in the far infrared region and microwave band.

What is claimed is:

1. A harmonic generator comprising a plurality of dielectric crystals each having an incidence plane and an exit plane which are parallel with each other, and control means coupled to at least one of said crystals to match the phase of an electromagnetic wave inciding perpendicularly upon the incidence plane of each crystal with the phases of the harmonics of said electromagnetic wave characterized in that said crystals are disposed in cascade such that the normal lines upon said incidence planes and said exit planes of said respective crystals are parallel with each other; and that the optical axes of adjacent ones of said crystals, as projected on the plane of incidence, intersect each other at right angles.

2. A harmonic generator comprising a plurality of dielectric crystals, each one of said crystals having an incidence plane and an exit plane which are parallel with each other and being cut such that normal lines upon said incidence planes and said exit planes intersect the optical axis of said crystal at a phase matching angle characterized in that, said crystals are disposed in cascade such that the normal lines upon said incidence planes and said exit planes of respective crystals are parallel with each other and that the optical axes of adjacent ones of said crystals, as projected on the plane of incidence, intersect each other at right angles.

3. The harmonic generator according to claim 1 wherein said control means comprises means to apply a voltage across said crystals and means to apply a voltage across said crystals and means to control said voltage.

4. The harmonic generator according to claim 1 wherein said control means comprises means to heat said crystals and means to control the temperature of said crystals.

5. The harmonic generator according to claim 1 wherein said control means comprises means to heat said crystals, means to control the temperature of said crystals, means to apply a voltage across said crystals and means to control said voltage.

6. The harmonic generator according to claim 3 wherein said voltage control means comprises a variable resistor.

7. The harmonic generator according to claim 4 wherein said means to heat said crystals comprises an electric heater.

8. The harmonic generator according to claim 4 wherein said temperature control means comprises a thermistor.

9. The harmonic generator according to claim 5 wherein the phase matching of said crystals is effected by at least one of said means to apply and control the voltage and said means to heat and control the temperature of said crystals.

10. A harmonic generator comprising: at least a first nonlinear dielectric crystal, said first crystal being cut such that the incidence plane and the exit plane thereof are parallel with each other, and that a normal line upon said incidence plane and said exit plane intersects the optical axis of said crystal at a phase matching angle; at least a second nonlinear dielectric crystal having an incidence plane and an exit plane which are parallel with each other; and means coupled to the second crystal to control the second crystal such that the phase of the electromagnetic wave inciding perpendicularly upon the incidence plane of said second crystal matches with the phases of the harmonics of said electromagnetic wave; said crystals being disposed in cascade such that normal lines upon the incidence planes and exit planes of respective crystals extend parallel with each other and that the projections of the optical axes of adjacent ones of said crystals on their respective incidence planes intersect each other at right angles with respect to each other.

11. The harmonic generator according to claim 10 wherein at at least one of means to apply heat and control the temperature of a crystal and means to apply voltage across the crystal and control said voltage.

* * * * *